(12) United States Patent
Williams et al.

(10) Patent No.: US 9,324,184 B2
(45) Date of Patent: Apr. 26, 2016

(54) IMAGE THREE-DIMENSIONAL (3D) MODELING

(75) Inventors: Samuel Williams, Redmond, WA (US); Jett Evan Jones, Redmond, WA (US); Peter G. Sibley, Seattle, WA (US); Don Kim, Bellevue, WA (US); Sandeep Kanumuri, Redmond, WA (US); Jonathan Rosenberg, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 132 days.

(21) Appl. No.: 13/325,466

(22) Filed: Dec. 14, 2011

(65) Prior Publication Data

US 2013/0155047 A1 Jun. 20, 2013

(51) Int. Cl.
*G06T 17/00* (2006.01)
*G06T 3/40* (2006.01)
(Continued)

(52) U.S. Cl.
CPC ............. *G06T 17/00* (2013.01); *G06T 3/4038* (2013.01); *G06T 7/0024* (2013.01); *G06T 15/205* (2013.01); *G06T 2207/10028* (2013.01); *G06T 2207/30252* (2013.01)

(58) Field of Classification Search
CPC ............. H04N 13/0296; H04N 5/247; H04N 13/0239; H04N 13/0242
USPC ......... 345/582, 423–425, 430, 435, 437, 442; 382/268, 271, 272, 275, 285
See application file for complete search history.

(56) References Cited

U.S. PATENT DOCUMENTS

| 5,973,726 A | 10/1999 | Iijima et al. |
| 6,064,399 A | 5/2000 | Teo |

(Continued)

FOREIGN PATENT DOCUMENTS

| CN | 1567385 A | 1/2005 |
| CN | 1641702 A | 7/2005 |

(Continued)

OTHER PUBLICATIONS

Shade, Jonathan, Steven J. Gortler, Li-wei He, and Richard Szeliski. 1998. Layered depth images. In Proceedings of the 25th annual conference on computer graphics and interactive techniques (SIGGRAPH 1998), Jul. 19-24, 1998, Orlando, Flor., ed. SIGGRAPH and Michael Cohen, 231-242. New York, N.Y.: ACM Press.*

(Continued)

*Primary Examiner* — Maurice L McDowell, Jr.
*Assistant Examiner* — Raffi Isanians
(74) *Attorney, Agent, or Firm* — Tom Wong; Steven Spellman; Micky Minhas (57) ABSTRACT

Among other things, one or more techniques and/or systems are disclosed for creating a three-dimensional model of an image. Image data, comprise a series of images of a location, such as along a route, can be received. The image data can comprise a first image element location for a first image element, where the first image element location may correspond to a three-dimensional point in the image, such as a location in the image with a depth from a point of observation. The first image element can be segmented into a first façade plane using the first image element location. The first façade plane can be merged with a second façade plane, resulting in a three-dimensional model of the image. The second façade plane can comprise a second image element, where the image data comprises a second image element location for the second image element.

20 Claims, 8 Drawing Sheets (51) Int. Cl.
*G06T 15/20* (2011.01)
*G06T 7/00* (2006.01)

(56) References Cited

U.S. PATENT DOCUMENTS

| | | | |
|---|---|---|---|
| 6,075,905 | A | 6/2000 | Herman et al. |
| 6,205,253 | B1 * | 3/2001 | King .................... 382/236 |
| 6,665,003 | B1 | 12/2003 | Peleg et al. |
| 7,110,592 | B2 | 9/2006 | Kotake |
| 7,298,548 | B2 | 11/2007 | Mian |
| 7,499,586 | B2 | 3/2009 | Agarwala |
| 7,558,432 | B2 | 7/2009 | Zaharia et al. |
| 7,580,076 | B2 | 8/2009 | Battles et al. |
| 7,760,269 | B2 | 7/2010 | Ochs et al. |
| 7,840,032 | B2 | 11/2010 | Ofek |
| 7,899,270 | B2 | 3/2011 | Kim |
| 8,174,562 | B2 | 5/2012 | Hartman |
| 8,269,822 | B2 | 9/2012 | Zalewski |
| 8,368,720 | B2 | 2/2013 | Peterson |
| 8,995,788 | B2 | 3/2015 | Williams et al. |
| 2001/0038718 | A1 | 11/2001 | Kumar et al. |
| 2002/0154812 | A1 | 10/2002 | Chen et al. |
| 2002/0167533 | A1 | 11/2002 | Tirumalai et al. |
| 2002/0176635 | A1 | 11/2002 | Aliaga et al. |
| 2002/0196188 | A1 | 12/2002 | Holt |
| 2005/0128196 | A1 | 6/2005 | Popescu et al. |
| 2006/0120625 | A1 | 6/2006 | Peleg et al. |
| 2007/0076920 | A1 | 4/2007 | Ofek |
| 2007/0103544 | A1 | 5/2007 | Nakazawa |
| 2007/0122058 | A1 | 5/2007 | Kitaura |
| 2008/0043020 | A1 | 2/2008 | Snow et al. |
| 2008/0066000 | A1 | 3/2008 | Ofek |
| 2008/0140309 | A1 | 6/2008 | Jendbro |
| 2008/0291201 | A1 | 11/2008 | LaFon |
| 2008/0309668 | A1 | 12/2008 | Borovikov |
| 2009/0021576 | A1 | 1/2009 | Linder et al. |
| 2009/0031246 | A1 | 1/2009 | Cowtan et al. |
| 2009/0079730 | A1 | 3/2009 | Lee et al. |
| 2009/0116764 | A1 | 5/2009 | Liu |
| 2010/0014436 | A1 | 1/2010 | Talagery |
| 2010/0014780 | A1 | 1/2010 | Kalayeh |
| 2010/0033553 | A1 | 2/2010 | Levy |
| 2010/0110069 | A1 | 5/2010 | Yuan |
| 2010/0118116 | A1 | 5/2010 | Tomasz et al. |
| 2010/0123737 | A1 | 5/2010 | Williamson |
| 2010/0157018 | A1 | 6/2010 | Lampotang et al. |
| 2010/0194851 | A1 | 8/2010 | Pasupaleti et al. |
| 2010/0201682 | A1 | 8/2010 | Quan |
| 2010/0215250 | A1 | 8/2010 | Zhu |
| 2010/0220893 | A1 | 9/2010 | Lee |
| 2010/0251101 | A1 | 9/2010 | Haussecker et al. |
| 2010/0259610 | A1 | 10/2010 | Petersen |
| 2010/0302280 | A1 | 12/2010 | Szeliski et al. |
| 2010/0309293 | A1 | 12/2010 | Plut |
| 2011/0018902 | A1 | 1/2011 | Ofek |
| 2011/0043604 | A1 | 2/2011 | Peleg et al. |
| 2011/0096957 | A1 | 4/2011 | Anai et al. |
| 2011/0141141 | A1 | 6/2011 | Kankainen |
| 2011/0141229 | A1 | 6/2011 | Stec et al. |
| 2011/0158509 | A1 | 6/2011 | Li et al. |
| 2011/0158528 | A1 | 6/2011 | Yea et al. |
| 2011/0211040 | A1 | 9/2011 | Lindemann et al. |
| 2011/0265023 | A1 | 10/2011 | Loomis et al. |
| 2011/0279445 | A1 | 11/2011 | Murphy et al. |
| 2011/0279446 | A1 | 11/2011 | Castro et al. |
| 2011/0302527 | A1 | 12/2011 | Chen et al. |
| 2011/0304699 | A1 | 12/2011 | Ito |
| 2012/0036433 | A1 * | 2/2012 | Zimmer et al. ............ 715/702 |
| 2012/0127158 | A1 | 5/2012 | Miyagi et al. |
| 2012/0133639 | A1 | 5/2012 | Kopf et al. |
| 2012/0294549 | A1 | 11/2012 | Doepke |
| 2013/0106990 | A1 | 5/2013 | Williams et al. |
| 2013/0155180 | A1 | 6/2013 | Wantland et al. |
| 2013/0155181 | A1 | 6/2013 | Williams et al. |
| 2013/0156326 | A1 | 6/2013 | Williams et al. |
| 2013/0242041 | A1 | 9/2013 | Hollinger |
| 2013/0249812 | A1 | 9/2013 | Ramos et al. |
| 2014/0002588 | A1 | 1/2014 | Ahiska |
| 2015/0249768 | A1 | 9/2015 | Williams et al. |
| 2015/0249786 | A1 | 9/2015 | Williams et al. |

FOREIGN PATENT DOCUMENTS

| | | |
|---|---|---|
| CN | 1845094 | 10/2006 |
| CN | 101251958 A | 8/2008 |
| CN | 101666656 | 3/2010 |
| CN | 101841727 | 9/2010 |
| CN | 101852620 | 10/2010 |
| CN | 101923709 A | 12/2010 |

OTHER PUBLICATIONS

M, Pollefeys. "Detailed Real-Time Urban 3D Reconstruction from Video—Springer." Detailed Real-Time Urban 3D Reconstruction from Video—Springer., Oct. 20, 2007. Web. Apr. 21, 2014.*

Brown, et al., "Automatic Panoramic Image Stitching using Invariant Features", Retrieved at <<http://mesh.brown.edu/engn1610/pdfs/Brown-ijcv2007.pdf>>, International Journal of Computer Vision, vol. 47, No. 1, 2007, pp. 59-73.

Levin, et al., "Seamless Image Stitching in the Gradient Domain", Retrieved at <<http://cs.engr.uky.edu/~jacobs/classes/2010_photo/readings/gradient_domain_stitching.pdf>>, Eighth European Conference on Computer Vision (ECCV), 2004, pp. 12.

Xiao; et al., "Image-based street-side city modeling", Published Dec. 2009, Proceedings: ACM SIGGRAPH Asia 2009, http://md1.csa.com/partners/viewrecord.php?requester=gs&collection=TRD&recid=201006340377341CI&q=&uid=788264198&setcookie=yes.

Xiao; et al., "Image-based Facade Modeling", Published Dec. 2008, Proceedings: ACM Transactions on Graphics (TOG) Proceedings of SIGGRAPH Asia 2008, http://web.mit.edu/jxiao/Public/publication/2008/TOG_facade/paper_low-res.pdf.

Micusk; et al., "Piecewise Planar City 3D Modeling from Street View Panoramic Sequences", Published Jun. 25, 2009, Proceedings: IEEE Conference on Computer Vision and Pattern Recognition, 2009 (CVPR 2009), pp. 2906-2912, pp. 2906-2912, http://ieeexplore.ieee.org/stamp/stamp.jsp?tp=&arnumber=5206535.

Kopf; et al., "Street Slide: Browsing Street Level Imagery", Retrieved Oct. 21, 2011, http://research.microsoft.com/en-us/um/people/cohen/street_slide.pdf.

"International Search Report", Mail Date: Mar. 22, 2013, Application No. PCT/US2012/067813, Filed date: Dec. 5, 2012, pp. 9.

Int. Search Report cited in PCT Application No. PCT/US2013/069951 dated Mar. 26, 2013, 9 pgs.

Non-Final Office Action cited in U.S. Appl. No. 13/325,466 dated Jun. 20, 2014, 22 pgs.

Reply Non-Final Office Action cited in U.S. Appl. No. 13/325,466 dated Dec. 21, 2014, 16 pgs.

Int. Preliminary Report cited in PCT Application No. PCT/US2013/069951 dated Jun. 17, 2014, 5 pgs.

First Chinese Office Action cited in Chinese Application No. 201210540807.5 dated May 16, 2014, 6 pgs.

Reply first Chinese Office Action cited in Chinese Application No. 201210540807.5 dated Sep. 28, 2014, 6 pgs.

Second Chinese Office Action cited in Chinese Application No. 201210540807.5 dated Jan. 6, 2015, 3 pgs.

First Chinese Office Action cited in Chinese Application No. 201210540664.8 dated Oct. 10, 2014, 5 pgs.

Agarwala, Aseem, "Photographing long scenes with multi-viewpoint panoramas", Published Date: 2006, http://vis.berkeley.edu/papers/longScenes/LongThings.pdf, 9 pgs.

Chinese Notice of Allowance in Application 201210540807.5, mailed Mar. 2, 2015, 6 pgs.

Chinese 2nd Office Action cited in Chinese Application No. 201210540664.8, mailed Jun. 12, 2015, 9 pgs.

(56) References Cited

OTHER PUBLICATIONS

Fleck, et al., "Graph Cut based Panoramic 3D Modeling and Ground Truth Comparison with a Mobile Platform—The Wagele", Retrieved at <<http://ieeexplore.ieee.org/stamp/stamp.jsp?tp=&arnumber=1640374>>, The 3rd Canadian Conference on Computer and Robot Vision, Jun. 7-9, 2006, pp. 10.
http://www.superhighstreet.com, front page, About Us page, and Help & FAQ pages, 6 pages, Feb. 12, 2008.
Kopf et al., "Street Slide: Browsing Street Level Imagery", Published Date: 2010, http://research.microsoft.com/pubs/121744/Kopf-sg10.pdf, 8 pgs.
Rav-Acha et al., "Minimal Aspect Distortion (MAD) Mosaicing of Long Scenes", International Journal of Computer Vision, vol. 28, Issue 2-3, Jul. 2008, pp. 187-206.
Roman et al., "Automatic Multiperspective Images", Proceedings of the 17th Eurographics Conference on Rendering Techniques, 2006.
Simonite, Technology Review, "A Smoother Street View", Published Date: Jul. 28, 2010, http://www.technologyreview.in/web/25880/, 4 pgs.
Szeliski, Richard, "Image Alignment and Stitching: A Tutorial", Published Date: Dec. 10, 2006, http://research.microsoft.com/pubs/70092/tr-2004-92.pdf, 89 pgs.
U.S. Appl. No. 12/957,124, Amendment and Response filed Oct. 29, 2013, 15 pgs.
U.S. Appl. No. 12/957,124, Amendment and Response filed Jun. 10, 2014, 13 pgs.
U.S. Appl. No. 12/957,124, Amendment and Response filed Jul. 19, 2013, 14 pgs.
U.S. Appl. No. 12/957,124, Notice of Allowance mailed Jul. 22, 2014, 8 pgs.
U.S. Appl. No. 12/957,124, Office Action mailed Mar. 10, 2014, 17 pgs.
U.S. Appl. No. 12/957,124, Office Action mailed Apr. 22, 2013, 22 pgs.
U.S. Appl. No. 12/957,124, Office Action mailed Jul. 31, 2013, 25 pgs.
U.S. Appl. No. 13/286,756, Amendment and Response filed Oct. 3, 2014, 12 pgs.
U.S. Appl. No. 13/286,756, Office Action mailed Nov. 18, 2014, 18 pgs.
U.S. Appl. No. 13/286,756, Office Action mailed Apr. 3, 2014, 19 pgs.
U.S. Appl. No. 13/325,430, Amendment and Response filed Dec. 21, 2014, 16 pgs.
U.S. Appl. No. 13/325,430, Office Action mailed Mar. 25, 2015, 18 pgs.
U.S. Appl. No. 13/325,430, Office Action mailed Jun. 20, 2014, 12 pgs.
U.S. Appl. No. 13/325,430, Amendment and Response filed Jul. 27, 2015, 15 pgs.
U.S. Appl. No. 13/325,652, Amendment and Response filed May 22, 2015, 14 pgs.
U.S. Appl. No. 13/325,652, Amendment and Response filed Sep. 25, 2014, 12 pgs.
U.S. Appl. No. 13/325,652, Office Action mailed Dec. 22, 2014, 12 pgs.
U.S. Appl. No. 13/325,652, Office Action mailed Mar. 25, 2014, 10 pgs.
Sibiryakov, Alexander, "Photo collection representation based on viewpoint clustering"—Published Date: Nov. 28, 2007, Proceedings: Electronic Imaging and Multimedia Technology, http://citeseerx.ist.psu.edu/viewdoc/download?doi=10.1.1.148.8701&rep=rep1&type=pdf, 12 pgs.
Kopf, et al., "Street Slide: Browsing Street Level Imagery"—Published Date: Jun. 20-25, 2009, Proceedings: Computer Vision and Pattern Recognition, 2009. CVPR 2009, IEEE Conference, http://research.microsoft.com/en-us/um/people/cohen/street_slide.pdf, 8 pgs.
Kroepfl, et al., "Efficiently Locating Photographs in Many Panoramas"—Published Date: 2010, Proceedings: 18th SIGSPATIAL International Conference on Advances in Geographic Information Systems, http://research.microsoft.com/en-us/um/people/cohen/street_slide.pdf, 10 pgs.
Chinese First Office Action cited in Chinese Application No. 201210541670.8 dated Feb. 16, 2015, 3 pgs.
PCT Int. Search Report cited in PCT Application No. PCT/US2012/069954 dated Apr. 29, 2013, 12 pgs.
PCT Int. Preliminary Report cited in PCT Application No. PCT/US2012/069954 dated Jun. 17, 2014, 6 pgs.
Chinese Second Office Action Issued in Patent Application No. 201210541675.8, Mailed Date: Oct. 19, 2015, 12 Pages.
U.S. Appl. No. 13/325,612, Office Action mailed May 15, 2014, 13 pgs.
U.S. Appl. No. 13/325,612, Amendment and Response filed Nov. 17, 2014, 10 pgs.
U.S. Appl. No. 13/325,612, Notice of Allowance mailed Dec. 1, 2014, 7 pgs.
Yining Deng et al., "Generating Panorama Photos", Proceedings of SPIE vol. 5242 Internet Multimedia Management Systems IV, (SPIE, Bellingham, WA, 2003), pp. 270-279.
Zheng, Jiang Yu, "Stabilizing Route Panoramas"—Published Date: Aug. 23-26, 2004, Proceedings: 17th International Conference on Pattern Recognition, vol. 1, http://www.cs.iupui.edu/.about.jzheng/deshaking.pdf.
U.S. Appl. No. 13/325,430, Office Action mailed Sep. 16, 2015, 22 pgs.

\* cited by examiner

IMAGE THREE-DIMENSIONAL (3D) MODELING

BACKGROUND

Digital photography can allow for a sequence of images to be stitched or glued together to provide for a relatively seamless transition from one image to the next. Further, images, such as side-view images, can be collected while traveling along a route, such as a street. Stitching these side-view images together can provide a user experience of travelling along the route, for example.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

A side or lateral-view of panoramic imagery may comprise a series of images (e.g., photo frames, video frames, etc.) stitched/glued together to form a somewhat seamless view of the imagery. This type of planar panorama imagery typically displays many of the stitched together images at a same time. Currently, images stitched together in this manner can be utilized in conjunction with digital mapping services, where, for example, a user may view planar panorama-type images of a street associated with a map they may be viewing.

When moving laterally along planar panorama imagery, however, a user might see different perspectives of objects in the panorama and/or objects in the images may be altered due to different viewing angles from which the different images were acquired and/or resulting from imprecisions in image stitching processes, for example. Desired objects may, for example, be obscured from view by other (e.g., foreground) objects due to a line of sight at image capture, and/or may comprise artifacts (e.g., distortions) that result in a diminished user experience.

Accordingly, one or more techniques and/or systems are disclosed that may provide a more natural viewing experience, for example, by creating a three dimensional (3D) model of image data comprising imagery and rendering a lateral panorama using the 3D model. In this way, for example, a user may view a desired object from different angles, distortions in stitched together images may be mitigated, and/or a more natural 3D effect can be applied to imagery. A natural 3D effect may be applied by distinguishing façade layers in the imagery, and grouping image elements (e.g., pixels) into their appropriate façade layers. A 3D location of an image element may be used to group the element into an appropriate façade layer, for example.

In one embodiment of creating a three-dimensional model of an image, image data comprising a first image element location can be received for a first image element in the image data. The first image element location may correspond to a three-dimensional point in the image. Further, the first image element can be segmented into a first façade plane based at least upon the first image element location. Additionally, the first façade plane can be merged with a second façade plane resulting in the three-dimensional model of the image. The second façade plane can comprise at least a second image element, where the image data comprises a second image element location for the second image element.

To the accomplishment of the foregoing and related ends, the following description and annexed drawings set forth certain illustrative aspects and implementations. These are indicative of but a few of the various ways in which one or more aspects may be employed. Other aspects, advantages and novel features of the disclosure will become apparent from the following detailed description when considered in conjunction with the annexed drawings.

DETAILED DESCRIPTION

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

As provided herein, a method may be devised that provides for creating a global three-dimensional (3D) model using image data, for example, where the image data may comprise a series of lateral images of a location (e.g., imagery), such as a roadside. The 3D model may be used to render a 3D version of the imagery, such as by rendering an object in the imagery from two different points of observation, for example. As an example, respective 3D points for pixels comprised in the imagery can be identified, and the 3D points may be grouped into façade planes. The façade planes may be merged together to create a 3D model. The resulting 3D model may be used to render the imagery in a variety of ways, for example, that may provide an enhanced user experience.

Figure 1:
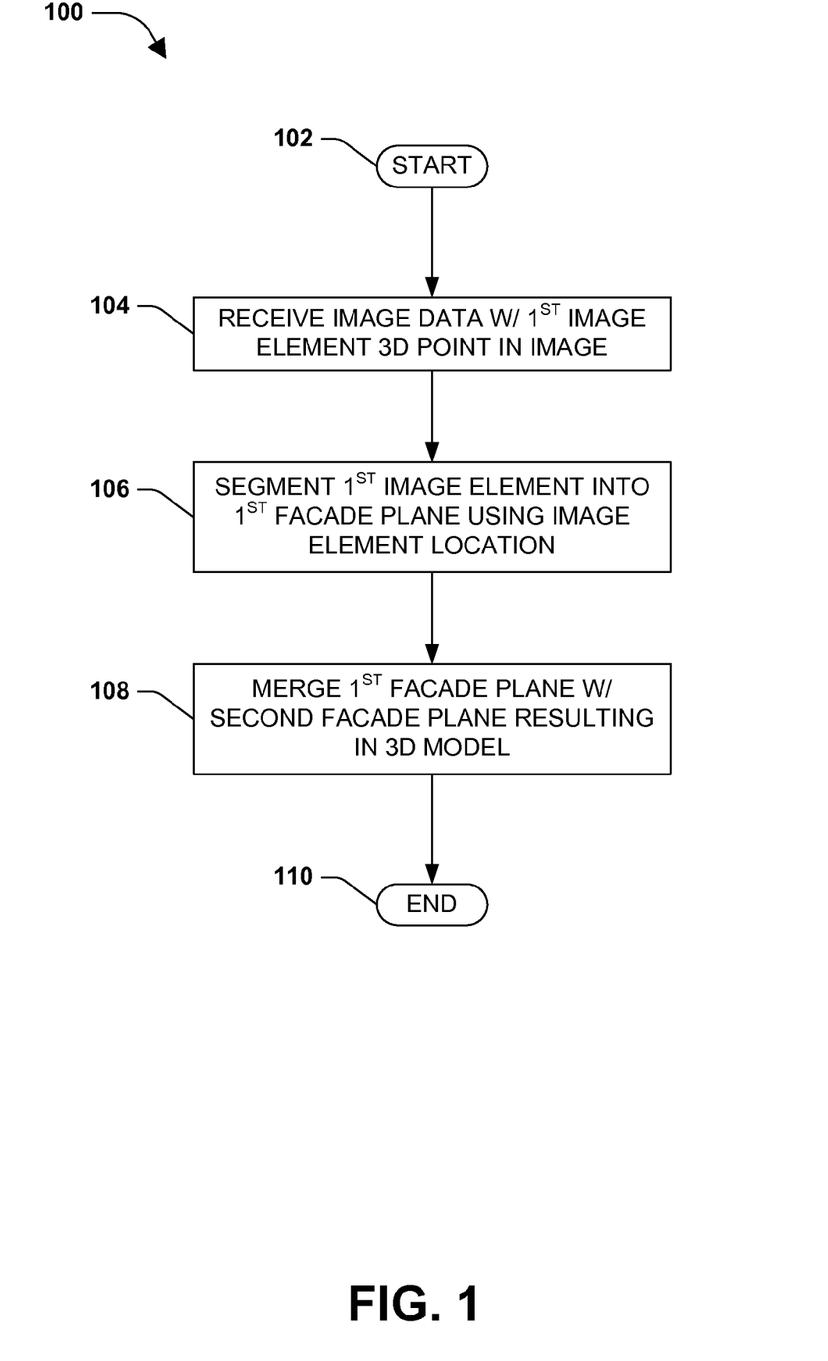
FIG. 1 is a flow diagram illustrating an exemplary method for creating a three-dimensional model of an image.

FIG. 1 is a flow diagram illustrating an exemplary method 100 for creating a three-dimensional model of an image. The exemplary method 100 begins at 102. At 104, image data can be received, where the image data comprises a first image element location for a first image element in the image data. The first image element location corresponds to a three-dimensional (3D) point in the image. As an example, an image element may comprise a pixel (e.g., or sub-pixel) of an image. Typically, for example, an image is comprised of a plurality of pixels, arranged in rows and/or columns (e.g., or some other pattern), to create objects, colors, shades, tones, etc., captured by the image.

In one embodiment, the image data may comprise a series of images captured for a location, such as along one or both sides of a street (e.g., captured while traveling along the street). Further, in one embodiment, respective image elements (e.g., pixels) in the image data may comprise a corresponding element location that identifies a 3D point in the image. In one embodiment, the image element location may comprise information identifying a two-dimensional (2D) location (e.g., X, Y coordinate), and a depth of the element (e.g., from a defined point).

For example, the 2D location can comprise a grid coordinate location (e.g., pixel location in columns and rows of image grid), which may be identified using a pre-defined grid overlaid on the image. Further, for example, the depth of the element may comprise a measurement (e.g., estimate) from a point of observation for the image (e.g., image capture location), and/or from a defined location (e.g., a side of a street comprised by the imagery).

At 106 in the exemplary method 100, the first image element is segmented into a first façade plane based at least upon the first image element location. In one embodiment, a façade plane may comprise a viewable portion of a face of one or more objects, such as a side of a building (e.g., or group of buildings), a portion of landscape, and/or a group of objects in a relatively similar plane, etc.

Further, in this example, respective objects in the image may comprise (e.g., or be comprised in) a corresponding façade plane that is situated at a particular depth. As an illustrative example, a front of a building may comprise a first façade plane, landscaping in front of the building may comprise a second façade plane, and mountains behind the building may comprise a third façade plane. In one embodiment, the element (e.g., pixel) location can help determine into which façade plane the element can be segmented, for example, based on its 2D location (e.g., falling within the building face) and depth (e.g., corresponding the depth of the building face from the point of image capture).

At 108 in the exemplary method 100, the first façade plane is merged with a second façade plane, resulting in the three-dimensional model of the image. The second façade plane comprises at least a second image element, where the image data comprises a second image element location for the second image element. As an example, the imagery may comprise a plurality of identified façade planes, respectively comprising image elements (e.g., pixels) segmented for (e.g., grouped together in) the façade plane.

The first and second façade planes can be merged to create a 3D model of the object for the imagery (e.g., providing different lines of sight for a same object). Additionally, as an example, a plurality of façade planes (e.g., representing a plurality of object faces) can be merged from a plurality of images, comprised in the image data, to generate a 3D model for the imagery represented by the image data. Having merged the first and second façade planes, resulting in the 3D model of the image, the exemplary method 100 ends at 110.

Figure 2:
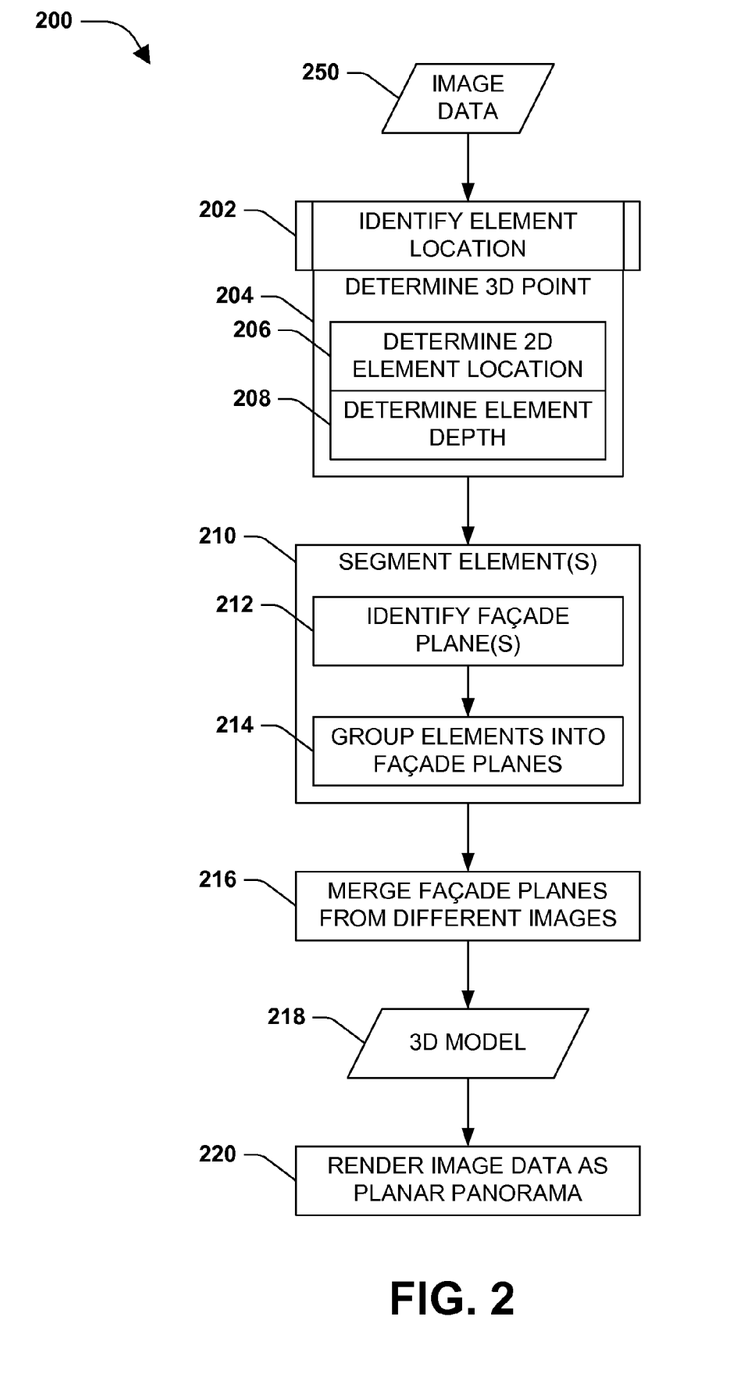
FIG. 2 is a flow diagram illustrating an example embodiment where one or more portions of one or more techniques described herein may be implemented.

FIG. 2 is a flow diagram illustrating an example embodiment 200 where one or more portions of one or more techniques described herein may be implemented. At 202, an image element location can be identified in image data 250. As one example, image data may comprise a series of images (e.g., photo frames, video frames, etc.), respectively capturing one or more locations from different observation points that when stitched and/or otherwise placed together form imagery comprising the one or more locations. As an illustrative example, respective images in the image data may be captured while traveling along a path (e.g., street, roadway, etc.), and the captured imagery can comprise a view of one or both sides of the path. In this example, the images are captured at desired intervals from each other, such that respective images comprise a desired imagery overlap with an adjacent image. When the images are combined (e.g., stitched, merged, etc.), for example, the resulting imagery may comprise a relatively seamless view of the location (e.g., side of the street).

In one embodiment, an image element may comprise a pixel. Often, "pixel" is used to describe a unit of an image, for example, where the unit may comprise a smallest element of the image that can be represented and/or controlled. As one example, a pixel may comprise an addressable screen element of a display device (e.g., screen pixel, sub-pixel), a single point in a raster image, and/or a single point in a printed picture. Further, as an example, a "pixel" may comprise an "address" corresponding to coordinates (e.g., X, Y coordinates, row and column coordinates, Euclidean space coordinates, etc.) for the image, and/or display screen. In one embodiment, the image element may comprise any type of image "unit" that can be represented and/or controlled.

In the example embodiment 200, identifying the image element location, at 202, can comprise determining a 3D point for the element, in the imagery, at 204. In one embodiment, determining the three-dimensional point can be based at least upon a two-dimensional image location for the image element and an image element depth for the image element. At 206, the two-dimensional image location can be determined, based at least upon a two-dimensional image element coordinate location (e.g., an "address" of the "pixel") in the image.

At 208, the image element depth (e.g., Z coordinate) can be determined. In one embodiment, the image element depth may be based on detection and ranging data collected at image capture. As one example, a light detection and ranging (LIDAR) device, a radio wave detection and ranging (RADAR) device, a device combining both light and radio wave detection and ranging (e.g., LADAR), and/or some other detection and ranging device (e.g., ultrasonic) may be used to collect the detection and ranging data at a same time that the image data is captured. That is, for example, when the image is captured (e.g., of a side of a street) the detection and ranging device may also capture depth data for objects comprised within the image.

In one embodiment, the image element depth may be based on stereoscopic estimation using at least two images respectively comprising different views. As one example, a type of "triangulation" may be used to estimate a Z-axis depth of a pixel in imagery, where the pixel comprises a portion of an object captured by the imagery, and the imagery comprises at least two different views of the portion of the object comprised by the pixel. In this example, a distance between the observation points of the at least two images is known, and a "line-of-sight" angle to the pixel is also known. Using the "known" information, a depth from a common observation point may be estimated (e.g., merely estimated due to image capture noise).

In one embodiment, the image element depth may be based on surface modeling of a location comprised by the image. As one example, a digital surface model (DSM) (e.g., DSM may also indicate "dense surface mapping," "dense surface modeling," and/or "digital surface mapping," which may be used synonymously with digital surface modeling) may comprise a 3D representation of a surface, such as a portion of the Earth. The DSM may indicate structures, terrain, landscaping, objects, depressions and/or other items on and/or in a modeled surface (e.g., area of a neighborhood). In one example, a DSM of an area comprised by the imagery may be reviewed, and one or more objects captured by the imagery may be identified in the DSM. In this example, an estimated depth between an identified object and a desired point of observation may be determined using the DSM, where a distance scale for the area comprised by the DSM may be used to determine an estimated distance (e.g., image element depth).

It will be appreciated that a determination of the image element depth is not limited to the embodiments described herein, and that the instant application, including the scope of the appended claims, is not intended to exclude alternate methods for identifying an image element depth. As an example, data comprising known object measurements (e.g., physical distance measurements identified in public and/or private records) may be used to estimate a depth from a desired observation point to an object.

Figure 3:
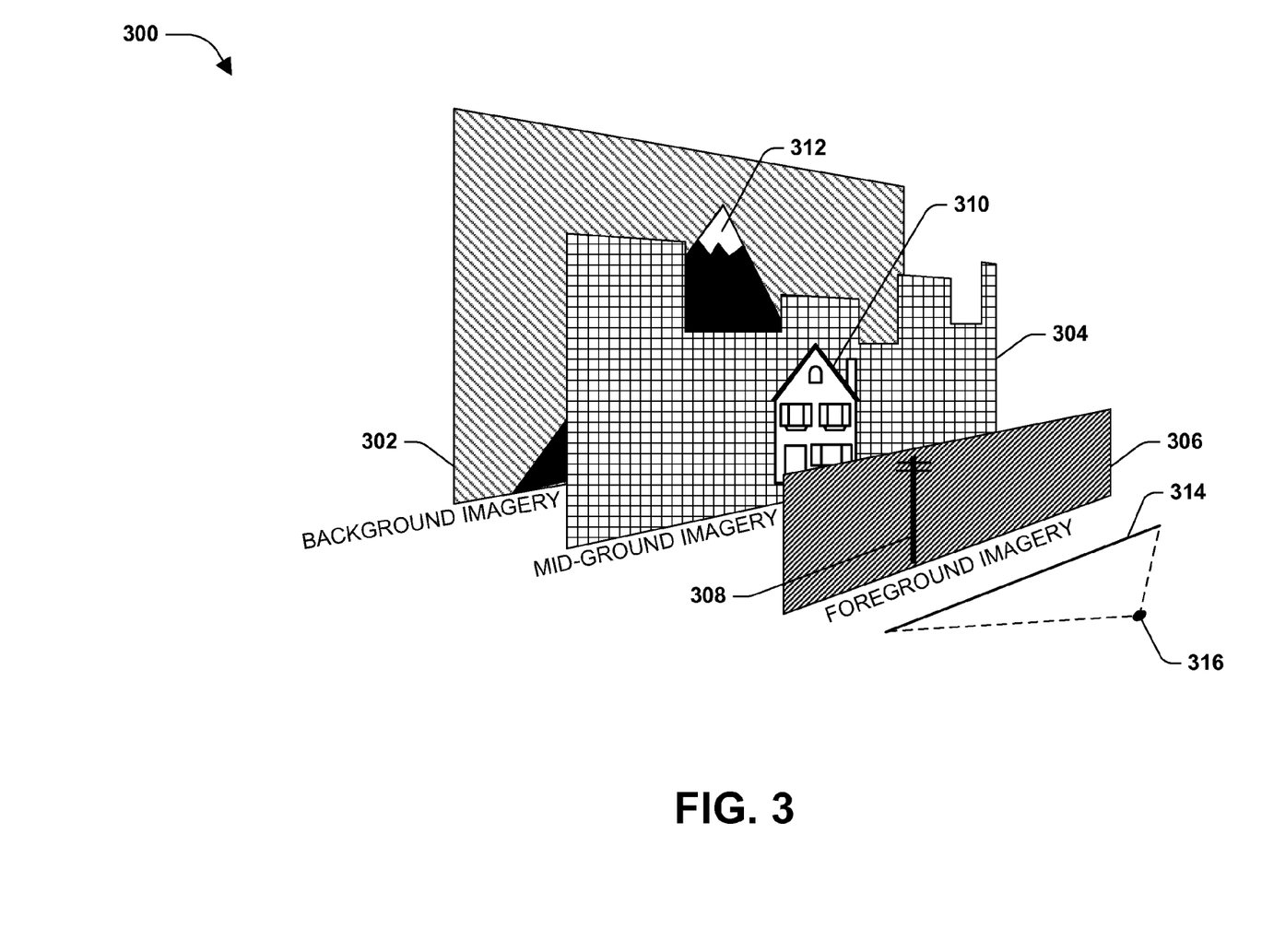
FIG. 3 illustrates an example embodiment where one or more portions of one or more techniques described herein may be implemented.

At 210 in the example embodiment 200, identified image elements can be segmented. At 212, one or more façade planes may be identified in the image data. In one embodiment, a façade plane may comprise a representation of a visible portion of an object face that lies in a plane. As an illustrative example, FIG. 3 is illustrates an example embodiment 300 where one or more portions of one or more techniques described herein may be implemented. As one example, an image may capture a view of objects, such as utilities, buildings and landscape objects, as viewed from a point of image capture.

In the example embodiment 300, a visible portion of a utility pole face 308 lies in a foreground plane 306; a visible portion of a building face 310 lies in a mid-ground plane 304; and a visible portion of a mountain face 312 lies in a background plane 302. In this example, the utility pole face 308 can serve to define a first façade plane; the building face 310 can serve to define a second façade plane; and the mountain face 312 can serve to define a third façade plane. That is, for example, image element location information for image elements (e.g., pixels) that make up the utility pole face 308 may indicate that these elements are substantially located a particular depth corresponding to the foreground plane 306 such that the foreground plane 306 is defined at this depth, or that the utility pole face 308 is located in the foreground plane 306. Similarly, image element location information for image elements (e.g., pixels) that make up the building face 310 may indicate that these elements are substantially located a particular depth corresponding to the mid-ground plane 304 such that the mid-ground plane 304 is defined at this depth, or that the building face 310 is located in the mid-ground plane 304. Also, image element location information for image elements (e.g., pixels) that make up the mountain face 312 may indicate that these elements are substantially located a particular depth corresponding to the background plane 302 such that the background plane 302 is defined at this depth, or that the mountain face 312 is located in the background plane 302. Further, as one example, the first, second and third façade planes may be comprised in a first image of the image data. In this example, a second image in the image data may comprise a fourth, fifth, and sixth façade plane, respectively comprising a different visible portion (e.g., face) of the utility pole, building and mountain.

Returning to FIG. 2, at 214, one or more image elements can respectively be grouped into a corresponding identified façade plane. In one embodiment, a first image element can be grouped with one or more first façade image elements, where the first façade image elements correspond to a first viewable portion of an object face at a first desired depth, for example.

Further, a second image element can be grouped with one or more second façade image elements, where the second façade image elements correspond to a second viewable portion of an object face at a second desired depth, for example.

In one embodiment, where façade planes are parallel to a view plane (e.g., a plane comprising a view from a desired observation point), the first image element can be grouped into the first façade plane that is comprised at a first desired façade depth, which corresponds to an image element depth for the first image element. As an illustrative example, in FIG. 3 an image may be broken or segmented into three parallel planes 302, 304, 306, which may be parallel to a view plane 314, as viewed from a desired observation point 316 (e.g., point of observation for a rendered view of the image).

In this example, the first image element may comprise a pixel having a 2D location (e.g., grid coordinates) that lies within the face of the utility pole face 308 in the image. Further, if the image element depth of the first image element is comprised within a desired depth range for the first plane 306, the first image element can be grouped into the first façade plane, for example. However, for example, if the image element depth of the first image element is comprised within a desired depth range for the second plane 304, the first image element may not be grouped into the first façade plane 306. As an example, from the desired observation point 316, the utility pole may lie in front of the building. In this example, if the 2D location of the first image element also lies within the building face 310, and the image element depth of the first image element is comprised within the desired depth range for the second plane 304, the first image element can be grouped into the second façade plane, for example, comprising the building face 310 (e.g., thus illustrating the utility pole in front of the building).

In one embodiment, façade planes may not be parallel to one another and/or the view plane. As an example, a side of a building viewed from an observational point in front of the building may comprise a plane having a Z-axis (e.g., depth) dimension. That is, for example, the first façade plane may lie along a vanishing point or ray from the point of observation, which is not parallel to the view plane. In this embodiment, the first image element may be grouped into the first façade plane if the first image element comprises a 2D location within the visible face of the object comprised by the first façade plane, and if the first image element comprises an image element depth within a desired depth range for the first façade plane (e.g., within a Z-axis range for the first façade plane).

Returning to FIG. 2, at 216, one or more first façade planes can be merged with one or more second façade planes to produce a 3D model 218. As one example, a first image can comprise a first façade plane, comprising a first visible face of an object (e.g., 308 of FIG. 3), and a second image can comprise a fourth façade plane, comprising a second visible face of the object (e.g., a different view of the same object). In this example, the first façade plane from the first image can be merged with the fourth façade plane of the second image to yield a 3D model.

In one embodiment, a first façade plane can be merged with a second façade plane in the first image, where the first façade plane is comprise at a first desired façade depth and the second façade plane is comprise at a second desired façade depth. Further, the first image can subsequently be merged with a second image, where the second image comprises merged façade planes, resulting in a 3D model 218. As an example, façade planes from the first image can be merged to create a first merged image, and façade planes from the second image can be merged to create a second merged image. In this example, the first merged image can be merged with the second merged image, thereby providing 3D image data of one or more objects in the merged images.

In one embodiment, a 3D point for a first image element location can be combined with a 3D point for a second image element location, resulting in the 3D model of the image. As an example, 3D points for respective image elements (e.g., pixels) from respective images in the image data may be combined to create the 3D model of the image. For example, pixels may be mapped to a global 3D model for the imagery using their respective 3D points. Further, in this example, two pixels that indicate a different view of a same portion of an object (e.g., from two different images) can be linked to the object in the 3D model, thereby allowing for different views of a same object to be rendered (e.g., from different viewpoints).

At 220 in the example embodiment 200, the image data can be rendered as a planar panorama image. As an example, a planar panorama image may comprise a lateral view of a location (e.g., a side of a street) made up of a series of relatively consecutive images stitched together to form a relatively seamless image of the location. In one embodiment, the planar panorama image can be rendered using one or more merged façade planes, where the planar panorama image may comprise a first composite view from a first view point and a second composite view from a second view point.

Figure 4A:
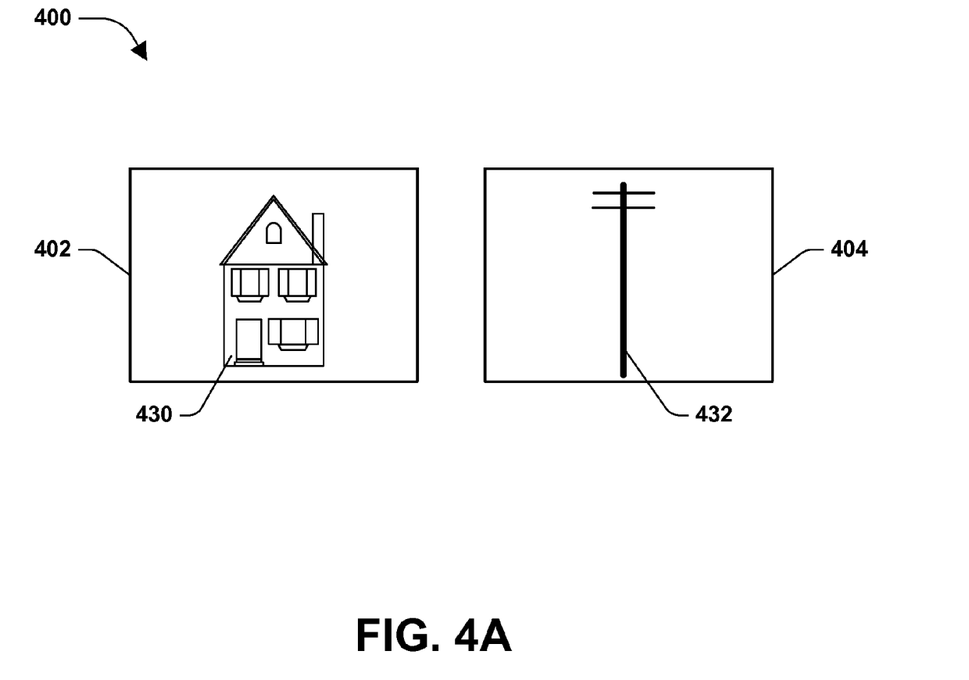
FIGS. 4A and 4B illustrate example embodiments where one or more portions of one or more techniques described herein may be implemented.
Figure 4B:
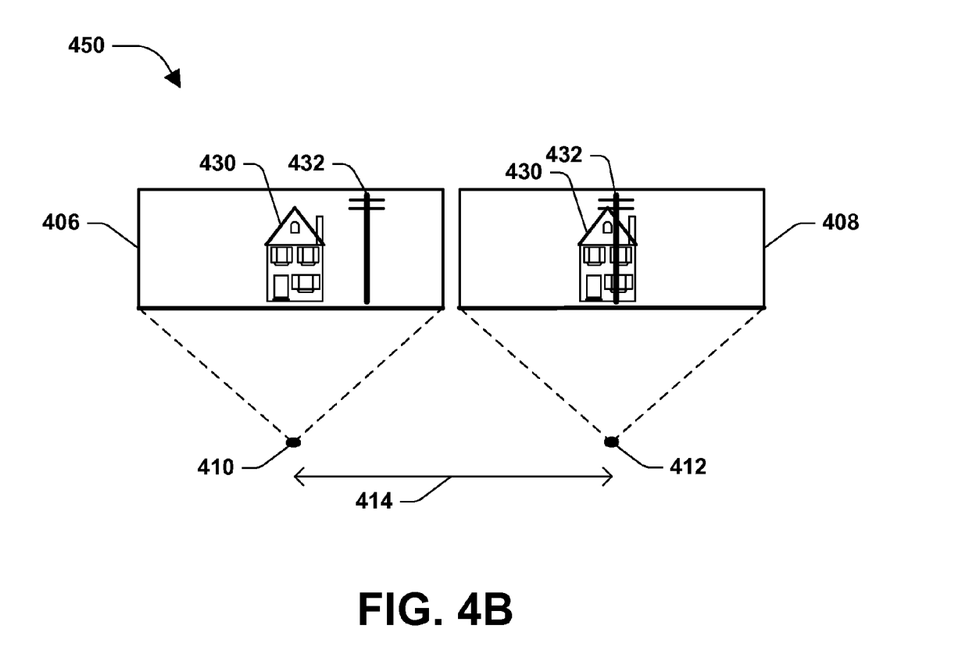

As an illustrative example, FIGS. 4A and 4B illustrate example embodiments 400, 450 where one or more portions of one or more techniques described herein may be implemented. In the example embodiment 400, a first portion 402 of imagery comprised within image data may comprise a first object 430 (building), and a second portion 404 of the imagery may comprise a second object 432 (utility pole). In this example, a 3D model of the image data may comprise a composite view of the building 430, where one or more façade planes comprising a visible face of the building 430 were merged. Further, the 3D model of the image data may comprise a composite view of the utility pole 432, where one or more façade planes comprising a visible face of the utility pole 432 were merged.

In the example embodiment 450, a first composite view 406 from a first view point 410 comprises a first view of the building 430 and the utility pole 432. Further, a second composite view 408 from a second view point 412 comprises a second view of the building 430 and the utility pole 432. In this example, the first view point 410 and the second view point 412 may be disposed at a known distance 414 from one another. That is, for example, as a user pans along a view of the planar panorama, a different view of the same object(s) may be rendered, thereby providing a three-dimensional viewing experience.

In one embodiment, the image of the planar panorama can be rendered, where a first façade plane may be rendered at a first panning speed and a second façade plane may be rendered at a second panning speed. As an illustrative example, with reference to FIG. 3 and FIG. 4B, different viewing angles of a same object in the imagery can be a result of parallax, an effect caused by viewing a same object from a different location, thereby providing a different line of sight to the object.

In the example embodiment 450, in a first composite view 406 of a street side scene the face of the building 430 and the face of the utility pole 432 do no overlap. In a second composite view 408 of the street side scene the face of the building 430 and the face of the utility pole 432 do overlap. In this example 450, it appears that the utility pole 432 has moved a greater distance than the building 430, between the first view point 410 and the second view point 412. The apparent disparity in object movement can be a result of parallax, where objects in the foreground appear to move faster than objects in the background when moving along a location.

In this embodiment, when a user pans along the rendered view of the planar panorama, for example, objects in a foreground façade plane may be panned at a faster speed than objects in a background façade plane, thereby accounting for or rather giving the impression of a natural parallax effect. As an illustrative example, in the example embodiment 300, when the planar panorama is rendered the first plane 306, comprising a view of the utility pole face 308, may be panned at a faster speed than the second plane 304, comprising a view of the building face 310. Further, in this example, the second plane 304 may be panned at a faster speed than the third plane, comprising a view of the mountain face 312.

A system may be devised that provides for generating a global three-dimensional (3D) model of image data, for example, where the 3D model may be used to create a 3D user experience of an image comprised by the image data. The 3D model may be used to render an object in resulting imagery from two different points of observation, for example. As an example, a 2D location of a pixel or image element in an image can be identified, and a depth relative to a point of observation can be determined for the pixel. The 2D pixel location and pixel depth may be used to group the pixel into a façade plane, which can be merged with one or more other façade planes to create a 3D model.

Figure 5:
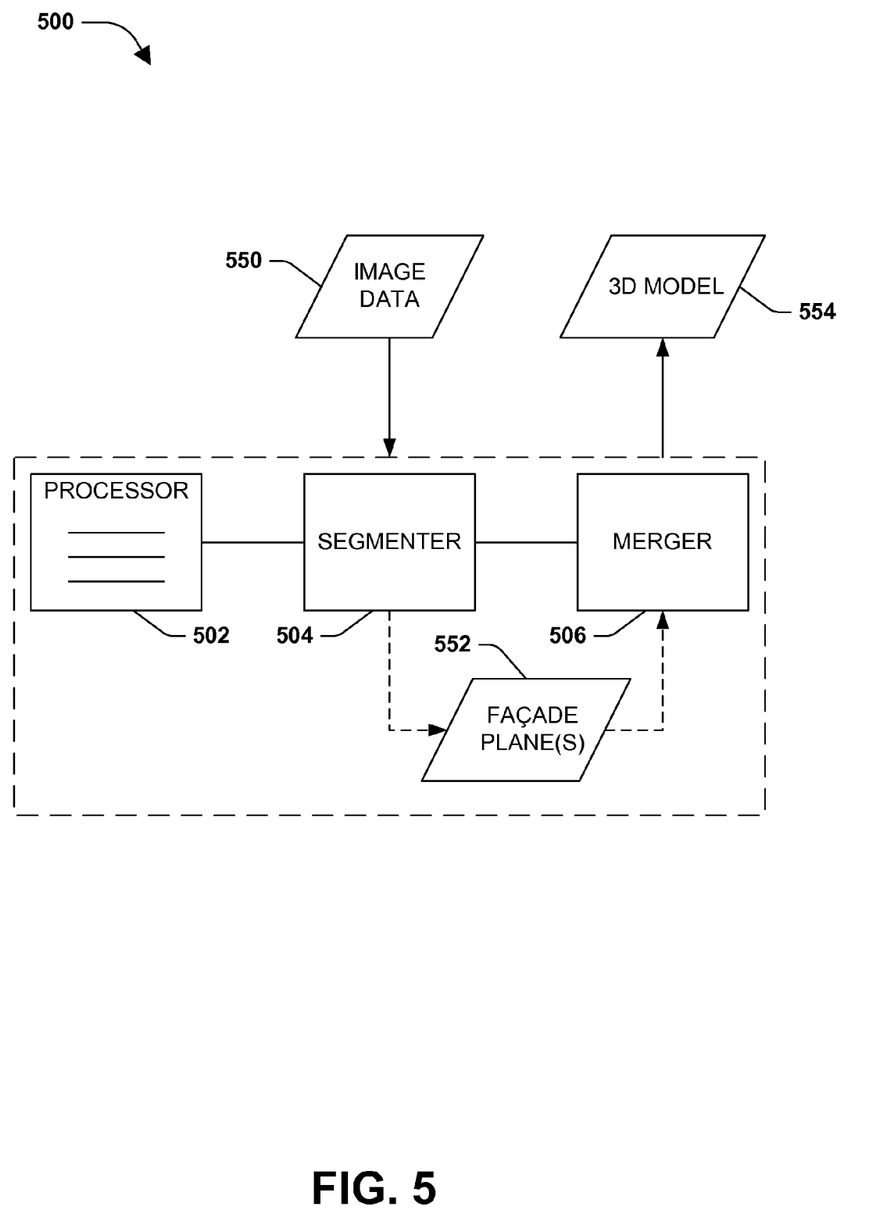
FIG. 5 is a component diagram illustrating an exemplary system for creating a three-dimensional model of an image.

FIG. 5 is a component diagram illustrating an exemplary system 500 for creating a three-dimensional model of an image. In the exemplary system 500, a computer-based processor 502 is configured to process data for the system 500, and the processor is operably coupled with a segmentation component 504. The segmentation component 504 is configured to segment a first image element into a first façade plane 552 based at least upon a first image element location comprised in received image data 550. The first image element location corresponds to a three-dimensional point in the image.

As an example, an image element can comprise a portion (e.g., a smallest portion) of the image that may be represented and/or controlled, such as a pixel (e.g., or sub-pixel). Further, for example, the image data 550 can comprise one or more images of a location, as well as a pixel location, comprising a 3D point of the pixel, for respective "pixels" in the one or more images. Additionally, as an example, a façade plane can comprise a viewable portion of a face of one or more objects in an image, such as a side of a building (e.g., or group of buildings), a portion of landscape, and/or a group of objects in a relatively similar plane. As one example, the segmentation component 504 can group a pixel into a façade plane if the pixel's 3D point aligns with the façade plane (e.g., within a desired range of coordinates in Euclidean space).

In the exemplary system 500, a merging component 506 is operably coupled with the segmentation component 504. The merging component 506 is configured to merge the first façade plane with a second façade plane resulting in the three-dimensional model of the image 554. The second façade plane comprises at least a second image element corresponding to a second image element location. As an example, the image data 550 may comprise a plurality of images of the location (e.g., a series of relatively sequential images along a route at the location/street), where respective images may comprise one or more façade planes.

As one example, the merging component 506 may merge the first façade plane, from a first image, with the second façade plane, from a second image. As another example, the first façade plane may comprise a first view of an object in the image data 550, and the second façade plane may comprise a second view of the object. In this example, merging different views of a same object may provide for creation of a 3D model.

Figure 6:
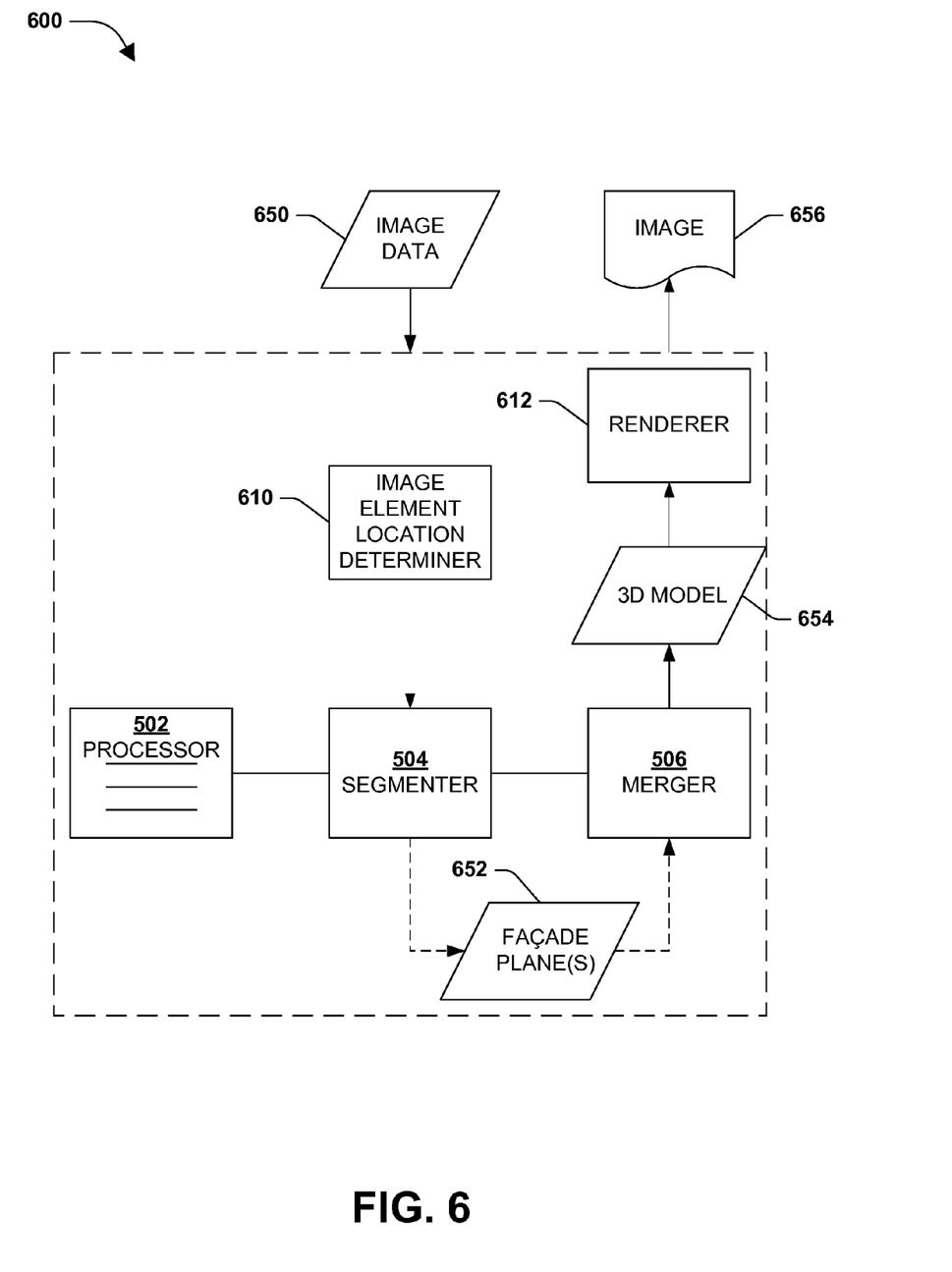
FIG. 6 is a component diagram illustrating an example embodiment where one or more portions of one or more systems described herein may be implemented.

FIG. 6 is a component diagram illustrating an example embodiment where one or more portions of one or more systems described herein may be implemented. In this example 600, an extension of FIG. 5 is provided and thus description of elements, components, etc. described with respect to FIG. 5 may not be repeated for simplicity. In the example embodiment 600, an image element location determination component 610 can be configured to determine the 3D location of an image element in the image data 650. The image element location determination component 610 may determine the 3D location based upon a two-dimensional image location for the image element and an image element depth for the image element.

In one embodiment, the two-dimensional image location for the image element can comprise a coordinate corresponding to a location in the image. As an example, the image element may comprise a "pixel," a term commonly used to identify a smallest unit of an image (e.g., rendered, displayed, drawn, printed, etc.) that can be represented and/or controlled. In one example, the "pixel" may comprise a display screen unit, where an "address" of the pixel comprises grid coordinates (e.g., comprising rows and columns) for the display window. As another example, the 2D image element location may comprise an "address," such as a plane coordinate location (e.g., X, Y axes). As one example, the plane comprising the "address" may comprise a view plane of the image (e.g., a viewable face of the image). In this example, the 2D image element location can correspond to the location on the view plane of the image.

In one embodiment, the image element depth can comprise an estimated distance between the image element (e.g., pixel) and a desired point of observation for the image (e.g., point of image capture, and/or point of view of the image). As one example, the pixel may be comprised in an object captured by the image. In this example, the image element depth can comprise an estimated distance between the object and the desired point of observation.

In one embodiment, the image element depth may be identified using detection and ranging data collected at image capture. For example, the detection and ranging data may be collected at same time the image is captured, where the detection and ranging data may be collected by a detection and ranging device (e.g., LIDAR, RADAR, LADAR, etc.). Further, in one embodiment, the image element depth may be identified utilizing stereoscopic estimation, which may use at least two images respectively comprising different views. As an example, a distance to a pixel, and/or object, may be estimated using a type of "triangulation," when line of sight angles to the pixel/object and a distance between the points of image capture for the two images are known.

Additionally, in one embodiment, the image element depth may be identified using dense surface mapping (DSM) of a location comprised by the image. As an example, DSM (e.g., which may also refer to dense surface modeling, digital surface mapping, and/or digital surface modeling, which can be used synonymously) may provide a 3D model of a surface, such as an area of the Earth comprised by the location captured by the image data 650. Further, as an example, the DSM can provide estimated distance measurements between points in the surface model. In one example, the estimated distance measurements may be used, such as by the image element location determination component 610, to identify the image element depth.

In one embodiment, the three-dimensional model of the image data 654 can comprise first merged façade planes corresponding to a first depth from two or more images, and can comprise second merged façade planes corresponding to a second depth from the two or more images. That is, for example, façade planes 652 from different images that have a same depth can be merged when creating the 3D model of the image data 654. Further, in one embodiment, the three-dimensional model of the image data 654 can comprise a plurality of merged façade planes from one or more images. As one example, the segmented façade planes 652 of a first image may be merged, and the segmented façade planes 652 of a second image may be merged. In this example, the merged façade planes from the first image can be combined with the merged façade planes of the second image.

Additionally, in one embodiment, the three-dimensional model of the image data 654 can comprise a plurality of merged three-dimensional points respectively corresponding to an image element location in the image. For example, as described above, respective "pixels" in the one or more images are associated with a 3D point in the image data 650. As one example, the "pixel" can be associated with an object. In this example, a first pixel may be comprised in a first view of the object, and a second pixel may be comprised in a second view of the object. Further, in this example, the image element locations for the first and second pixels may be merged to create at least a portion of the 3D model of the object.

In the example embodiment 600, a rendering component 612 can be configured to render a planar panorama image 656. The planar panorama image 656 can comprise a three-dimensional representation of a combination of one or more images. As an example, the planar panorama image 656 may comprise a lateral view of a location (e.g., a human-scale, side view of a street) made up of a series of relatively consecutive images merged together to form a relatively seamless image of the location (e.g., street).

In one embodiment, the planar panorama image 656 can comprise an independently rendered view-point for respective one or more image element locations. In this embodiment, for example, the planar panorama image 656 can be rendered such that it comprises a first view of an object from a first view point and a second view of the object from a second view point. That is, for example, as a user pans along a view of the planar panorama, a different view of the same object may be rendered from a different view angle, thereby providing a three-dimensional viewing experience. Moreover, façade planes may move a different speeds such that a first façade plane moves at a first speed and a second façade plane moves at a second speed during panning (e.g., foreground object moves faster than a background object, etc.).

Figure 7:
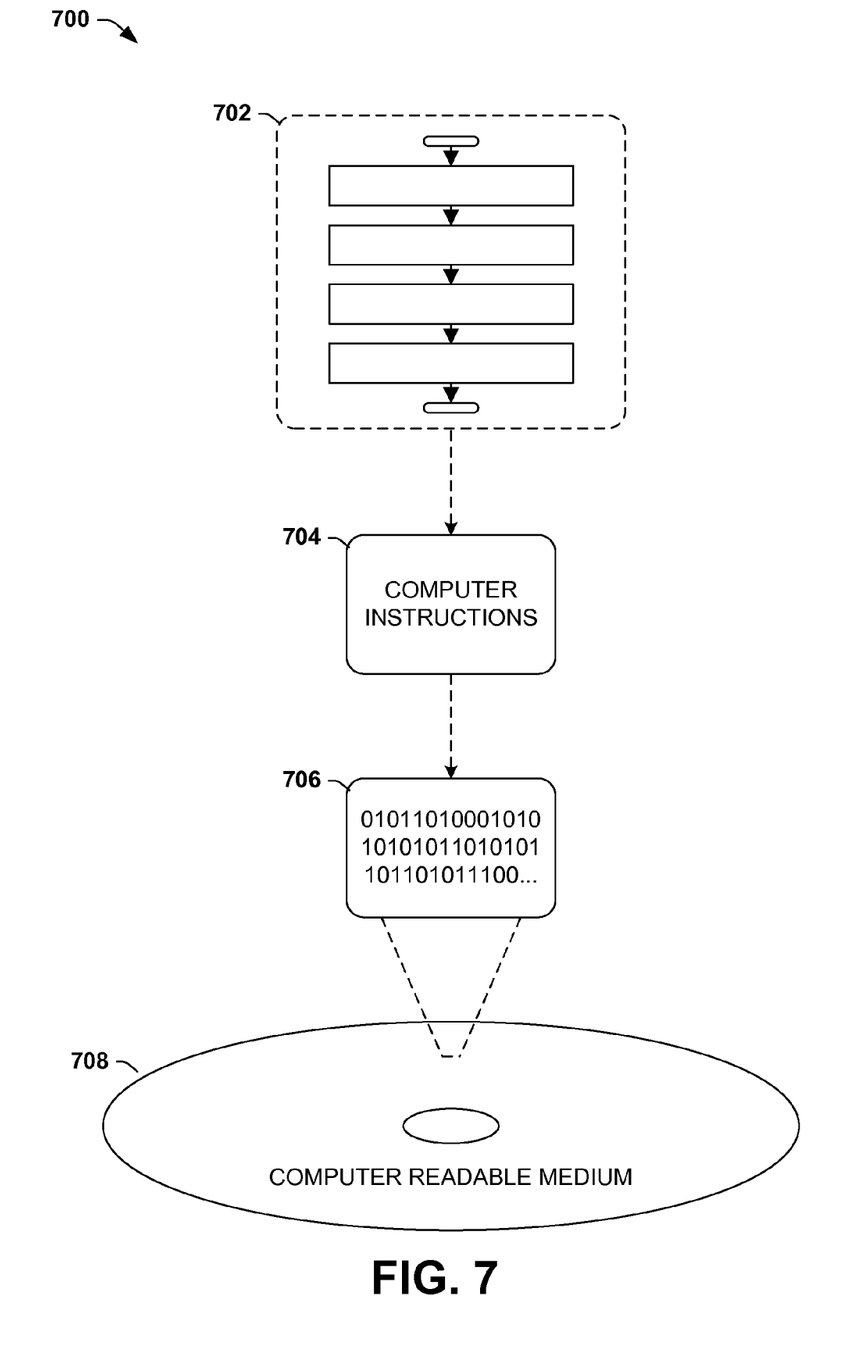
FIG. 7 is an illustration of an exemplary computer-readable medium comprising processor-executable instructions configured to embody one or more of the provisions set forth herein.

Still another embodiment involves a computer-readable medium comprising processor-executable instructions configured to implement one or more of the techniques presented herein. An exemplary computer-readable medium that may be devised in these ways is illustrated in FIG. 7, wherein the implementation 700 comprises a computer-readable medium 708 (e.g., a CD-R, DVD-R, or a platter of a hard disk drive), on which is encoded computer-readable data 706. This computer-readable data 706 in turn comprises a set of computer instructions 704 configured to operate according to one or more of the principles set forth herein. In one such embodiment 702, the processor-executable instructions 704 may be configured to perform a method, such as at least some of the exemplary method 100 of FIG. 1, for example. In another such embodiment, the processor-executable instructions 704 may be configured to implement a system, such as at least some of the exemplary system 500 of FIG. 5, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system," "interface," and the like are generally intended to refer to a computer-related entity, either hardware, a combination of hardware and software, software, or software in execution. For example, a component may be, but is not limited to being, a process running on a processor, a processor, an object, an executable, a thread of execution, a program and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device, carrier or media. Of course, those skilled in the art will recognize many modifications may be made to this configuration without departing from the scope or spirit of the claimed subject matter.

Figure 8:
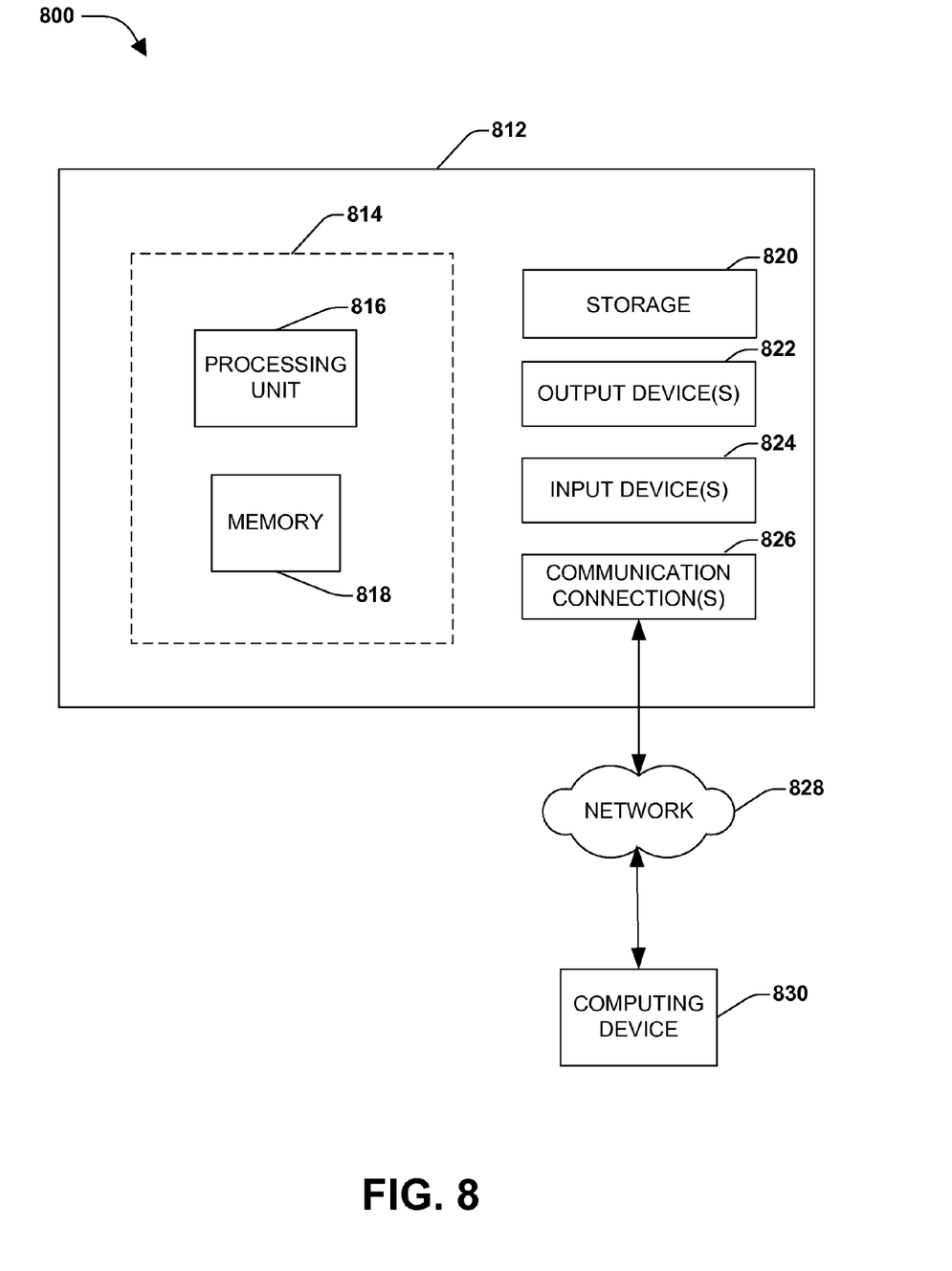
FIG. 8 illustrates an exemplary computing environment wherein one or more of the provisions set forth herein may be implemented.

FIG. 8 and the following discussion provide a brief, general description of a suitable computing environment to implement embodiments of one or more of the provisions set forth herein. The operating environment of FIG. 8 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 8 illustrates an example of a system 800 comprising a computing device 812 configured to implement one or more embodiments provided herein. In one configuration, computing device 812 includes at least one processing unit 816 and memory 818. Depending on the exact configuration and type of computing device, memory 818 may be volatile (such as RAM, for example), non-volatile (such as ROM, flash memory, etc., for example) or some combination of the two. This configuration is illustrated in FIG. 8 by dashed line 814.

In other embodiments, device 812 may include additional features and/or functionality. For example, device 812 may also include additional storage (e.g., removable and/or non-removable) including, but not limited to, magnetic storage, optical storage, and the like. Such additional storage is illustrated in FIG. 8 by storage 820. In one embodiment, computer readable instructions to implement one or more embodiments provided herein may be in storage 820. Storage 820 may also store other computer readable instructions to implement an operating system, an application program and the like. Computer readable instructions may be loaded in memory 818 for execution by processing unit 816, for example.

The term "computer readable media" as used herein includes computer storage media. Computer storage media includes volatile and nonvolatile, removable and non-removable media implemented in any method or technology for storage of information such as computer readable instructions or other data. Memory 818 and storage 820 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 812. Any such computer storage media may be part of device 812.

Device 812 may also include communication connection(s) 826 that allows device 812 to communicate with other devices. Communication connection(s) 826 may include, but is not limited to, a modem, a Network Interface Card (NIC), an integrated network interface, a radio frequency transmitter/receiver, an infrared port, a USB connection or other interfaces for connecting computing device 812 to other computing devices. Communication connection(s) 826 may include a wired connection or a wireless connection. Communication connection(s) 826 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 812 may include input device(s) 824 such as keyboard, mouse, pen, voice input device, touch input device, infrared cameras, video input devices, and/or any other input device. Output device(s) 822 such as one or more displays, speakers, printers, and/or any other output device may also be included in device 812. Input device(s) 824 and output device(s) 822 may be connected to device 812 via a wired connection, wireless connection, or any combination thereof. In one embodiment, an input device or an output device from another computing device may be used as input device(s) 824 or output device(s) 822 for computing device 812.

Components of computing device 812 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 812 may be interconnected by a network. For example, memory 818 may be comprised of multiple physical memory units located in different physical locations interconnected by a network.

Those skilled in the art will realize that storage devices utilized to store computer readable instructions may be distributed across a network. For example, a computing device 830 accessible via network 828 may store computer readable instructions to implement one or more embodiments provided herein. Computing device 812 may access computing device 830 and download a part or all of the computer readable instructions for execution. Alternatively, computing device 812 may download pieces of the computer readable instructions, as needed, or some instructions may be executed at computing device 812 and some at computing device 830.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Further, At least one of A and B and/or the like generally means A or B or both A and B. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A computer-based method, comprising:
    receiving a two-dimensional image comprising a first image element and a second image element, the first image element representing a first object in the two-dimensional image and the second image element representing a second object in the two-dimensional image;
    determining a first depth for the first object relative to an observation point;
    determining a second depth for the second object relative to the observation point;
    segmenting, by a processing unit, the first image element into a first façade plane representing objects having depths within a first depth range relative to the observation point, the first depth within the first depth range;
    segmenting the second image element into a second façade plane representing objects having depths within a second depth range relative to the observation point, the second depth within the second depth range, the second façade plane parallel to the first façade plane; and
    merging the first façade plane with the second façade plane resulting in a three-dimensional model of the two-dimensional image, the three-dimensional model providing for movement of the first façade plane at a first speed relative to the observation point and the second façade plane at a second speed relative to the observation point, the first speed different than the second speed.

2. The method of claim 1, wherein the first image element corresponds to a first pixel of the two-dimensional image.

3. The method of claim 2, wherein the second image element corresponds to a second pixel of the two-dimensional image.

4. The method of claim 1, wherein the determining a first depth comprising determining the first depth based at least upon stereoscopic estimation using at least two images respectively comprising different views.

5. The method of claim 1, wherein the determining a first depth comprising determining the first depth based at least upon surface modeling of a scene depicted by the two-dimensional image.

6. The method of claim 1, wherein the determining a first depth comprising determining the first depth based at least upon light detection and ranging (LIDAR).

7. The method of claim 1, wherein the determining the first depth comprising determining the first depth based at least upon radio wave detection and ranging (RADAR).

8. The method of claim 1, wherein the first object is different than the second object.

9. The method of claim 1, further comprising merging the first façade plane and the second façade plane with a third façade plane representing objects having depths within a third depth range relative to the observation point.

10. The method of claim 9, further comprising rendering a planar panorama using the first façade plane, the second façade plane, and the third façade plane after the merging.

11. The method of claim 1, wherein the first image element is different than the second image element.

12. The method of claim 1, further comprising rendering a planar panorama using the three-dimensional model of the two-dimensional image.

13. A system, implemented at least in part via a processing unit, comprising:
  at least one processor; and
  a memory, operatively connected with the at least one processor, storing computer-executable instructions that, when executed, cause the at least one processor to:
    receive a two-dimensional image comprising a first image element and a second image element, the first image element representing a first object in the two-dimensional image and the second image element representing a second object in the two-dimensional image, the second object different than the first object;
    determine a first depth for the first object relative to an observation point;
    determine a second depth for the second object relative to the observation point; a segmentation component configured to:
    segment the first image element into a first façade plane representing objects having depths within a first depth range relative to the observation point, the first depth within the first depth range; and
    segment the second image element into a second façade plane representing objects having depths within a second depth range relative to the observation point, the second depth within the second depth range; and
    merge the first façade plane with the second façade plane resulting in a three-dimensional model of the two-dimensional image.

14. The system of claim 13, wherein the first image element corresponds to a first pixel of the two-dimensional image and the second image element corresponds to a second pixel of the two-dimensional image.

15. The system of claim 13, wherein the three-dimensional model providing for movement of the first façade plane at a first speed relative to the observation point and the second façade plane at a second speed relative to the observation point, and wherein the first speed is different than the second speed.

16. The system of claim 13, wherein the computer-executable instructions, when executed, cause the at least one processor to determine the first depth based at least upon stereoscopic estimation using at least two images respectively comprising different views.

17. The system of claim 13, wherein the computer-executable instructions, when executed, cause the at least one processor to determine the first depth based at least upon light detection and ranging (LIDAR).

18. The system of claim 13, wherein the computer-executable instructions, when executed, cause the at least one processor to determine the first depth based at least upon radio wave detection and ranging (RADAR).

19. The system of claim 13, wherein the first image element is different than the second image element.

20. A computer readable device comprising computer executable instructions that when executed perform a method, comprising:
  receiving an image comprising a first image element and a second image element, the first image element representing a first object in the image and the second image element representing a second object in the image;
  determining a first depth for the first object relative to an observation point;
  determining a second depth for the second object relative to the observation point;
  segmenting the first image element into a first façade plane representing objects having depths within a first depth range relative to the observation point, the first depth within the first depth range;
  segmenting the second image element into a second façade plane representing objects having depths within a second depth range relative to the observation point, the second depth within the second depth range; and
  merging the first façade plane with the second façade plane resulting in a three-dimensional model of the image.

* * * * *